Patented July 9, 1935

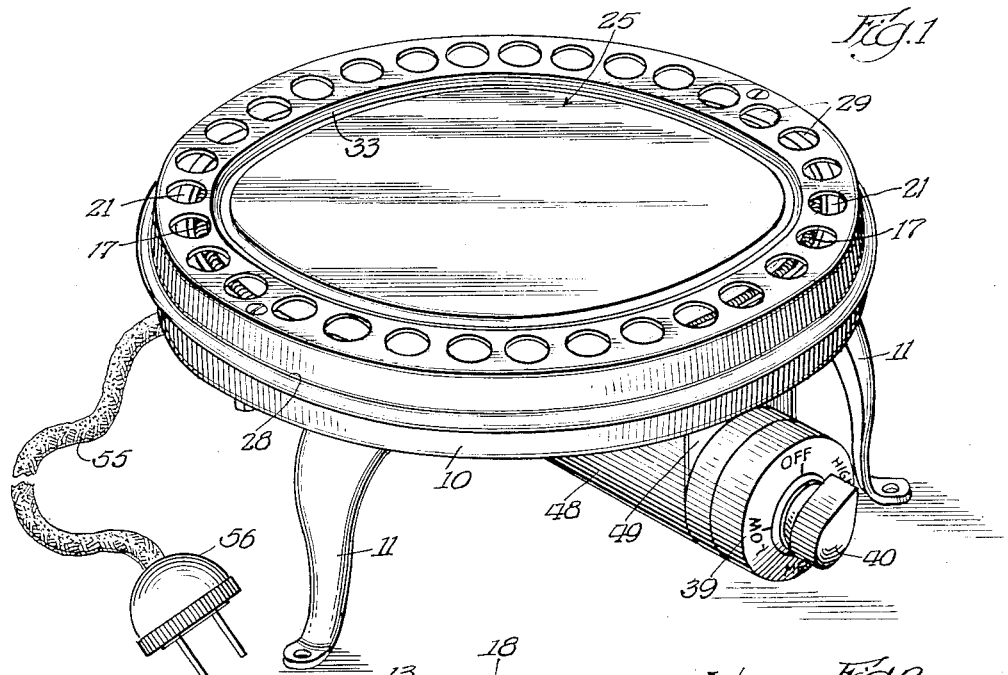
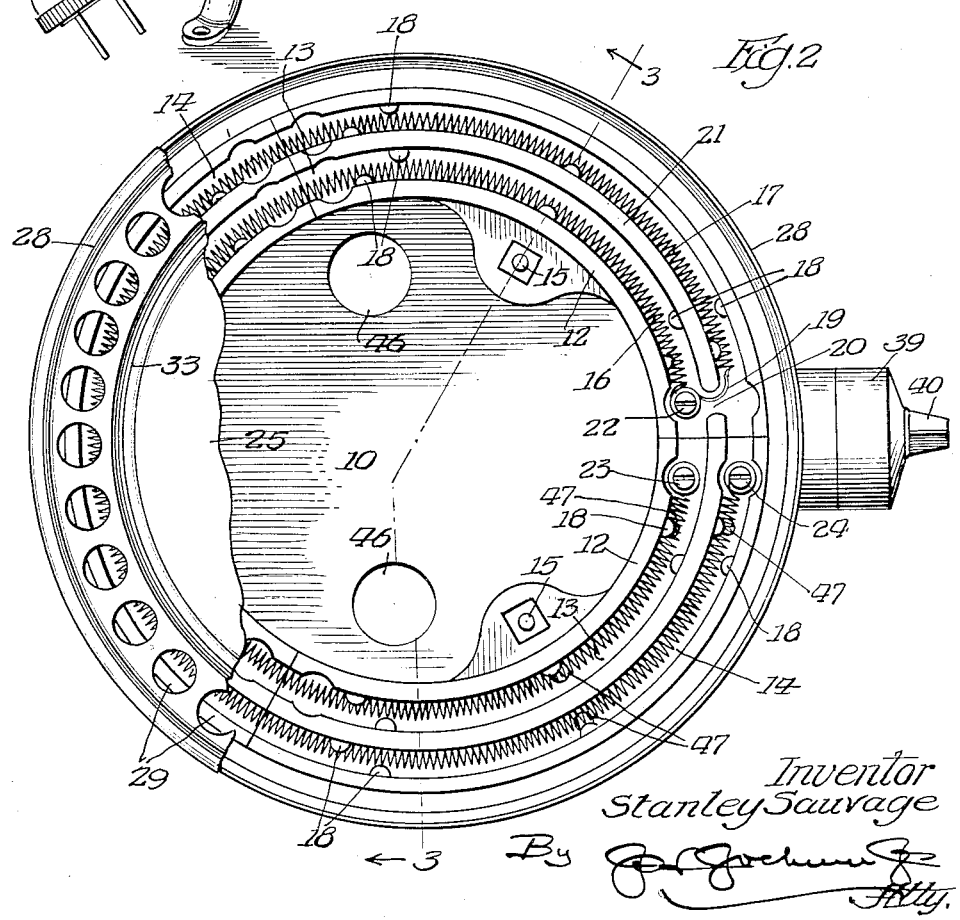

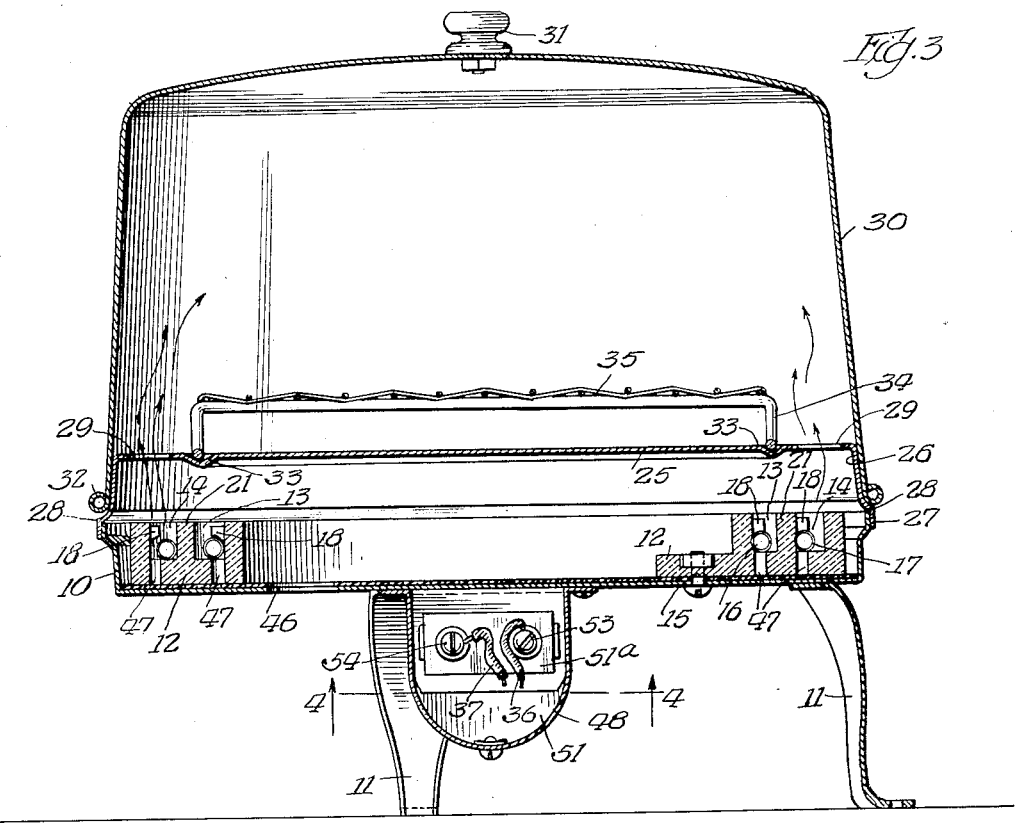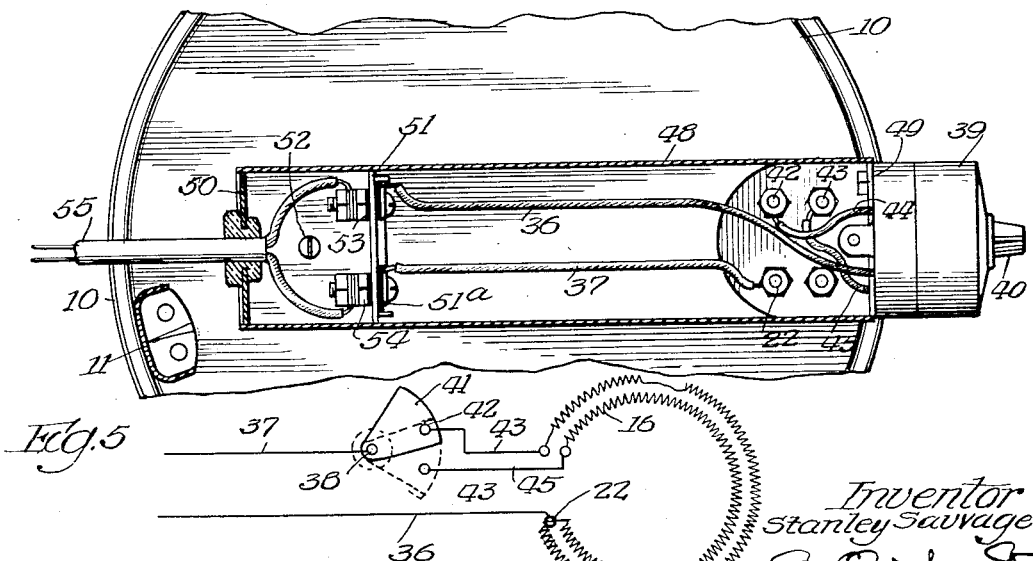

2,007,876

UNITED STATES PATENT OFFICE 2,007,876

COOKING APPARATUS

Stanley Sauvage, Chicago, Ill.

Application April 22, 1933, Serial No. 667,393

7 Claims. (Cl. 219—37)

This invention relates in general to cooking apparatus, but more specifically to an improved portable device of this character provided with a self-contained heating medium, such as an electric heater, installed in the base thereof, and which apparatus, when a hood is employed in connection therewith, will provide a simple, efficient and effective oven.

A further object is to provide an improved apparatus of this character wherein means are provided whereby the cooking operation will be performed by radiant heat.

A further object is to provide in an apparatus of this character improved means whereby the degree of heat may be readily controlled at will.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which Figure 1 is a perspective view of an apparatus of this character constructed in accordance with the principles of this invention and without a hood.

Figure 2 is a top plan view of Figure 1, with parts broken away.

Figure 3 is a vertical, irregular sectional view taken on line 3—3, Figure 2, and showing in section and in connection therewith a hood and an article supporting rack.

Figure 4 is a detail sectional view taken on line 4—4, Figure 3, with parts omitted and parts broken away.

Figure 5 is a diagrammatic view of one form of wiring mechanism or heating element suitable for the purpose.

Referring more particularly to the drawings the numeral 10 designates generally a base which is preferably of a cup shaped formation and constructed of any suitable material. The base is supported by means of suitable supporting legs 11, and arranged within the base thus formed is an insulating element 12 provided with concentrically arranged annular recesses 13 and 14, one encompassing the other and both disposed in close proximity to the periphery of the base.

The element 12 is also of an annular configuration and may be secured in position within the base in any suitable manner, such as by means of fastening bolts 15. The element 12 is preferably of a height substantially equal to the height of the wall of the base 10 and formed of a plurality of arc shaped sections arranged end to end as clearly shown in Figure 2, a fastening element 15 being provided for each section.

Arranged within the annular recesses 13—14 are resistance coils 16 and 17 held against accidental displacement in any desired or suitable manner such as by means of lugs or projections 18 on the walls of the recesses and beneath which the coils are adapted to be positioned.

The coils 16 and 17 are connected together at one end as at 19, an opening 20 being provided in the wall 21 of the recesses for that purpose, and the connected ends of the coils are secured to a binding post or terminal 22. The other ends of the coils 16 and 17 are respectively connected to binding posts 23—24.

Extending over the base is a cover plate 25 constructed of any desired or suitable material and is provided with a peripheral wall 26 so shaped that the free edge thereof will telescope as at 27, over the edge of the wall of the base 10. The wall 26 is shaped to form a circumferential shoulder 28, for a purpose to be hereinafter set forth.

The plate 25 is preferably spaced for a substantial distance above the top of the insulating member 12 and also above the coils 18, and the plate is provided with a plurality of openings 29 extending therearound and being disposed in close proximity to the periphery of the plate.

These openings 29 are so arranged that portions thereof will be disposed directly above one of the coils preferably the coil 17, while the coil 16 will be disposed beneath an imperforate portion of the plate or member 25.

A hood or cover 30 is provided and is constructed of any suitable material of any desired configuration having a handle 31, and the hood is adapted to telescope over the plate or member 25 and to fit closely about the peripheral wall 26. The edge of the hood may preferably be curled as at 32, and when the hood is in position the edge 32 will rest upon the shoulder 28 formed in the wall 26 of the plate or member 25.

If desired, the member 25 may be provided with a circumferential groove or channel 33 opening through the top thereof so as to receive the legs 34 of an article supporting rack 35 which may be removably positioned upon the plate or member 25.

A service wire 36 is connected to the binding post 22, and the other line wire 37 is connected to a binding post 38 of a switch, diagrammatically illustrated at 39. The switch is provided with a handle 40 to which is connected a switch member 41, and co-operating with the switch member 41 are binding posts 42—43. A conductor 44 leads from the end of the coil 17 to the binding post 42, and a conductor 45 leads from the end of the coil 16 to the binding post 43.

With this construction it will be manifest that assuming the switch member 41 to be in the position shown in full lines in Figure 5, the outer coil 17 will be energized by reason of the fact that the current will flow only through the outer coil. When the switch member 41 is in the position shown in dotted lines in Figure 5, the circuit will be completed through both of the coils 16 and 17 and both will serve to supply heat to the inside of the hood 30.

When, however, the switch member 41 is positioned to contact only with the binding post 43, the outer coil 17 will be dead, while the current will flow through the inner coil 16.

Obviously, any other form of three point switch device may be employed in connection with this cooking apparatus, and therefore it is to be considered that the switch mechanism herein shown is only illustrated and described as a simple means for controlling the coils of the apparatus.

With this improved constructiton it will be manifest that inasmuch as the openings 29 in the plate or member 25 are disposed directly above the outer coil 17, when this coil is heated by the current flowing therethrough radiant heat will flow into the hood 30 and the hood will be illuminated thereby, with the result that cooking performed by this coil will be by way of radiant heat.

When, however, the coil 17 is cut out by the switch device and the coil 16 is cut into the circuit the cooking will be done by way of heat from the coil 16, as the coil 16 is located beneath an imperforate portion of the plate or member 25. The use of this coil 16 alone will produce what might be termed "low heat", while the use of the coil 17 alone will produce what might be termed "medium heat".

When, however, it is desired to cook with what might be termed "high heat", both of the coils 16 and 17 will be connected in the circuit by means of the switch member 41 bridging the contacts 42 and 43. The result will be that the radiant heat from the coil 17 will be augmented by the heat from the coil 16 and a high degree of heat will be produced within the hood 13.

The base member 10 may be provided with any desired number of openings 46 for the purpose of ventilation, and if desired, additional openings 47 may also be provided in the bottom of the insulating element 12 for the purpose of lightness.

It will be manifest that by reason of the fact that the coils extend around the base member adjacent the periphery thereof, an even distribution of heat will be produced, as no portion of the coils will be disposed under the central portion of the plate or member 25, but the plate or member 25 will be heated from below by means of radiated heat from the coils 16 when the latter are cut into the circuit.

The line wires 36 and 37 are arranged beneath the base of the apparatus and may be encased within a housing 48 of a U shaped formation, the ends of the housing being closed by depending walls 49—50 carried by the base. The wall 49 may be formed by cutting out a portion of the base 10 and bending the same as shown more clearly in Figure 4.

The wall 50, together with a partition 51 may be connected to the base by means of a suitable fastening device 52, such as a screw or the like and the partition 51 serves as a supporting means for binding posts 53 and 54, to which the conductors 36—37 are respectively connected, and to which also may be connected the terminals of a service cord 55, to the free end of which latter is connected a plug 56, which is adapted to be inserted into an ordinary wall socket.

Suitable insulating material 51ᵃ may be provided for insulating the binding posts 53 from the partition 51.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A portable unitary cooking plate comprising a body portion comparatively thin with relation to its cross sectional diameter, said body comprising two opposed substantially cup shaped members, the peripheries of which are telescoped, means separably securing said members together, a heating unit removably secured in the bottom member and provided with heating elements, the upper member being provided with openings therethrough only adjacent the periphery thereof to provide an imperforate portion of substantial diameter encompassed by said openings, and means for selectively controlling said heating elements.

2. A portable unitary cooking plate comprising a body portion comparatively thin with relation to its cross sectional diameter, said body comprising two opposed substantially cup shaped members, the peripheries of which are telescoped, a heating unit entirely housed between said members and removably secured in the bottom member and provided with annular heating elements arranged adjacent the periphery of the unit, the upper member of the body portion being provided with openings therethrough only adjacent the periphery thereof to expose only portions of certain of said elements and to provide an imperforate portion of substantial diameter encompassed by said openings, and means for selectively controlling said heating elements.

3. A portable unitary cooking plate comprising a body portion comparatively thin with relation to its cross sectional diameter, said body comprising two opposed substantially cup shaped members, the peripheries of which are telescoped, a heating unit entirely housed between said members and removably secured in the bottom member and provided with heating elements, the upper member being provided with openings therethrough only adjacent the periphery thereof to provide an imperforate portion of substantialy diameter encompassed by said openings, means for selectively controlling said heating elements, and a hood for covering the top body member, the end of the hood telescoping with the periphery of the said top member.

4. A portable unitary cooking plate comprising a body portion comparatively thin with relation to its cross sectional diameter, said body comprising two opposed substantially cup shaped members, the peripheries of which are telescoped, a heating unit entirely housed between said members and removably secured in the bottom member and provided with annular heating elements arranged adjacent the periphery of the unit, the upper member of the body portion being provided with openings therethrough only adjacent the periphery thereof to expose only portions of certain of said elements and to provide an imperforate portion of substantial diameter encompassed by said openings, means for selectively controlling said heating elements, and a hood for covering the top body member, the end of the hood telescoping with the periphery of the said top member.

5. A portable unitary cooking plate comprising a body portion comparatively thin with relation to its cross sectional diameter, supporting legs therefor, said body embodying opposed comparatively shallow members with their peripheries telescoped, an annular heating unit entirely housed by and removably secured between the members, said unit comprising an annular body having an inner diameter of considerable extent, heating elements mounted upon the last said body, the top body member having openings therethrough only adjacent the periphery thereof, and means for selectively controlling said elements.

6. A portable unitary cooking plate comprising a body portion comparatively thin with relation to its cross sectional diameter, supporting legs therefor, said body embodying opposed comparatively shallow members with their peripheries telescoped, an annular heating unit entirely housed by and removably secured between the members, said unit comprising an annular body having an inner diameter of considerable extent, and annular heating elements concentrically arranged and mounted upon the last said body, the top body member having openings therethrough only adjacent the periphery thereof, a portion of said units being disposed beneath a portion of said openings, and another portion of said elements being disposed entirely beneath the imperforate portion of the said top member.

7. A portable unitary cooking plate comprising a body portion comparatively thin with relation to its cross sectional diameter, said body comprising two opposing substantially cup shaped members, the peripheries of which are telescoped, a heating element housed within the plate, the upper member of the plate being provided with openings therethrough only adjacent the periphery thereof to provide a central imperforate portion of substantial diameter encompassed by said openings, means for selectively controlling the heating element, a circumferential shoulder encompassing the periphery of said plate and spaced from the top of the plate, and a hood adapted to telescope with a portion of the plate and rest upon said shoulder.

STANLEY SAUVAGE.